US010320895B2

United States Patent
Puri et al.

(10) Patent No.: US 10,320,895 B2
(45) Date of Patent: Jun. 11, 2019

(54) LIVE MIGRATION OF LOAD BALANCED VIRTUAL MACHINES VIA TRAFFIC BYPASS

(71) Applicant: Microsoft Technology Licensing, LLC, Redmond, WA (US)

(72) Inventors: Ranjit Puri, Bothell, WA (US); Vikas Bhardwaj, Redmond, WA (US); Madhan Sivakumar, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 15/352,512

(22) Filed: Nov. 15, 2016

(65) Prior Publication Data

US 2018/0139272 A1    May 17, 2018

(51) Int. Cl.
*H04L 29/08* (2006.01)
*G06F 9/50* (2006.01)
(Continued)

(52) U.S. Cl.
CPC ...... *H04L 67/1014* (2013.01); *G06F 9/45533* (2013.01); *G06F 9/45558* (2013.01);
(Continued)

(58) Field of Classification Search
CPC ............. H04L 67/1014; H04L 67/1023; H04L 41/082; G06F 9/5088
See application file for complete search history.

(56) References Cited

U.S. PATENT DOCUMENTS

| 8,190,769 B1 | 5/2012 | Shukla et al. |
| 8,327,060 B2 | 12/2012 | Heim |

(Continued)

FOREIGN PATENT DOCUMENTS

WO    2015135611 A1    9/2015

OTHER PUBLICATIONS

Gandhi, et al., "Duet: Cloud Scale Load Balancing with Hardware and Software", In Proceedings of the ACM conference on SIGCOMM, Aug. 17, 2014, pp. 27-38.
(Continued)

*Primary Examiner* — Kim T Nguyen
(74) *Attorney, Agent, or Firm* — BakerHostetler

(57) ABSTRACT

Methods, systems, and devices are described herein for managing a load balancer bypass between two virtual machines through live migration of at least one of the virtual machines. In one aspect, a load balancer bypass may be established between a source virtual machine associated with a source host and a destination virtual machine associated with a destination host. The source virtual machine identification information, source host identification information, destination virtual machine identification information, and destination host identification information may be associated with an indication of whether the bypass is active, for example, in a bypass data structure. Upon a determination that live migration of at least one of the source virtual machine or the destination virtual machine has been completed to a third host, the bypass data structure may be updated with identification information of the third host to maintain the load balancer bypass after completion of the live migration.

19 Claims, 11 Drawing Sheets

(51) Int. Cl.
*H04L 12/24* (2006.01)
*G06F 9/455* (2018.01)
*H04L 29/14* (2006.01)
*H04L 12/46* (2006.01)

(52) U.S. Cl.
CPC .......... *G06F 9/5077* (2013.01); *G06F 9/5088* (2013.01); *H04L 12/4633* (2013.01); *H04L 41/082* (2013.01); *H04L 67/10* (2013.01); *H04L 67/1002* (2013.01); *H04L 67/1023* (2013.01); *H04L 69/40* (2013.01); *G06F 2009/4557* (2013.01); *H04L 67/1038* (2013.01); *H04L 2012/4629* (2013.01)

(56) References Cited

U.S. PATENT DOCUMENTS

| | | |
|---|---|---|
| 8,396,986 B2 | 3/2013 | Kanada et al. |
| 8,819,678 B2 | 8/2014 | Tsirkin |
| 9,104,460 B2 | 8/2015 | Jansen |
| 9,141,625 B1 | 9/2015 | Thornewell et al. |
| 9,152,448 B2 | 10/2015 | Wang et al. |
| 2010/0017515 A1* | 1/2010 | Nishiguchi ........... G06F 9/5077 709/226 |
| 2010/0302940 A1 | 12/2010 | Patel et al. |
| 2013/0031294 A1* | 1/2013 | Feng ..................... G06F 9/06 711/6 |
| 2013/0031544 A1 | 1/2013 | Sridharan et al. |
| 2015/0370596 A1 | 12/2015 | Fahs et al. |
| 2016/0055019 A1 | 2/2016 | Thakkar et al. |

OTHER PUBLICATIONS

Gutierrez-Garcia, et al., "Agent-based load balancing in Cloud data centers", In Journal of Cluster Computing, vol. 18, Issue 3, May 24, 2015, 22 pages.

Patel, et al., "Ananta: Cloud Scale Load Balancing", In Proceedings of the ACM SIGCOMM conference on SIGCOMM, Aug. 12, 2013, pp. 207-218.

Malkin, et al., "RIPng for IPv6", In Internet Engineering Task Forcet IETF, Standard Internet Society (ISOC), Jan. 1, 1997, 20 Pages.

"International Search Report and Written Opinion Issued in PCT Application No. PCT/US2017/060483", dated Feb. 5, 2018, 14 Pages.

* cited by examiner

LIVE MIGRATION OF LOAD BALANCED VIRTUAL MACHINES VIA TRAFFIC BYPASS

TECHNICAL FIELD

This disclosure relates generally to live migration of virtual machines, and more specifically to live migration of load balanced virtual machines in a software defined network.

BACKGROUND

Virtualization of networks is common in modem datacenters for various applications. Virtualization allows datacenter tenants to create a network with an addressing scheme that is suitable for various workloads and also allows the tenant administrator to set networking policies within their network as they see fit.

These virtualized tenant networks are an overlay atop of the underlying physical network of the datacenter. The networking interfaces in a tenant virtual machine (VM) are therefore connected directly to the virtualized tenant network (or the overlay network). Switches, which are aware of both virtualized networks and the physical networks, perform appropriate transformations to ensure that packets are delivered to and from the virtualized network endpoints in a way that both the overlay endpoints and the underlay endpoints are unaware of the specifics of the network virtualization intended by the tenant administrators.

Programming of virtualization aware switches is typically done by a software defined network (SDN) controller. An SDN controller may maintain a repository of the intended networking state in the datacenter and also incorporate logic to achieve that state, e.g. by programming switches.

Load balancing is a typical function desired in modem datacenters. Load balancers map virtualized IPs (VIP) to a set of Data Center IPs (DIPs). DIP endpoints may represent endpoints inside the virtualized network of a tenant. VIPs are typically internet or at least datacenter routable, e.g., they are not typically virtualized. DIPs on the other hand are typically virtualized. In order to perform the translation between non virtualized (VIP) endpoints and virtualized (DIP) endpoints, load balancers running under an SDN controller must be aware of the network virtualization policies that the SDN controller intends to achieve in the datacenter. Load balancers must also work in concert with other components in the SDN controller to achieve load balancing of workloads virtualized in the tenant space.

In a typical datacenter, hosts sometimes need to be taken out of service for example, for servicing, maintenance, upgrades to server software, etc. In such cases, tenant workloads are typically live migrated to another host so that the workloads experience minimal or no down time. In the live migration scenario, CPU context for all processes running within the migrated workload is ensured to be restored on the destination host. In a similar way, it is also beneficial to ensure that the network flows terminating at the migrating workload are restored at the destination host. This is also true for flows originating outside the datacenter such as those coming over a load balancer.

In other cases, DIP endpoints may not be virtualized, such as if they are associated with VMs that contribute to a datacenter's infrastructure. These DIPS may also be behind or work in conjunction with a load balancer and/or be live migrated. As used herein, a DIP endpoint may be virtualized or non-virtualized.

In most datacenters, a significant percentage of traffic across the load balancer is due to traffic that originates from a VM in the datacenter and is targeted to another VM within the datacenter, such that both source and destination VMs are behind the load balancer. This is referred to as East West traffic (EW traffic) from the perspective of the load balancer. In some cases, EW traffic may be configured to bypass the load balancer. Managing and maintaining these EW traffic bypasses through live migration of a VM can present challenges. Accordingly, improvements can be made in techniques for maintaining EW traffic bypasses through live migration.

SUMMARY

Illustrative examples of the disclosure include, without limitation, methods, systems, and various devices. In one aspect methods, systems, and devices are described herein for managing a load balancer bypass between two virtual machines through live migration of at least one of the virtual machines. In one aspect, a load balancer bypass may be established between a source virtual machine associated with a source host and a destination virtual machine associated with a destination host. The source virtual machine identification information, source host identification information, destination virtual machine identification information, and destination host identification information may be associated with an indication of whether the bypass is active, for example, in a bypass data structure. Upon a determination that live migration of at least one of the source virtual machine or the destination virtual machine has been completed to a third host, the bypass data structure may be updated with identification information of the third host to maintain the load balancer bypass after completion of the live migration.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Systems and techniques are described herein for supporting or managing a load balancer bypass between two virtual machines through with live migration of at least one of the virtual machines. In existing datacenter systems, a notification may be generated and sent to every host in the datacenter to update host information associated with the migrated VM. This notification process can be optimized by maintaining a heartbeat mechanism at the MUX or load balancer. Each host may send a heartbeat to the MUX to indicate that it is still utilizing a bypass flow that the MUX is aware of/programmed the host to implement. The MUX may maintain a cache, table, or data structure based on these heartbeats, and generate live migration notifications for a VM only for hosts associated with VMs communicating with the migrating VM.

Figure 1:
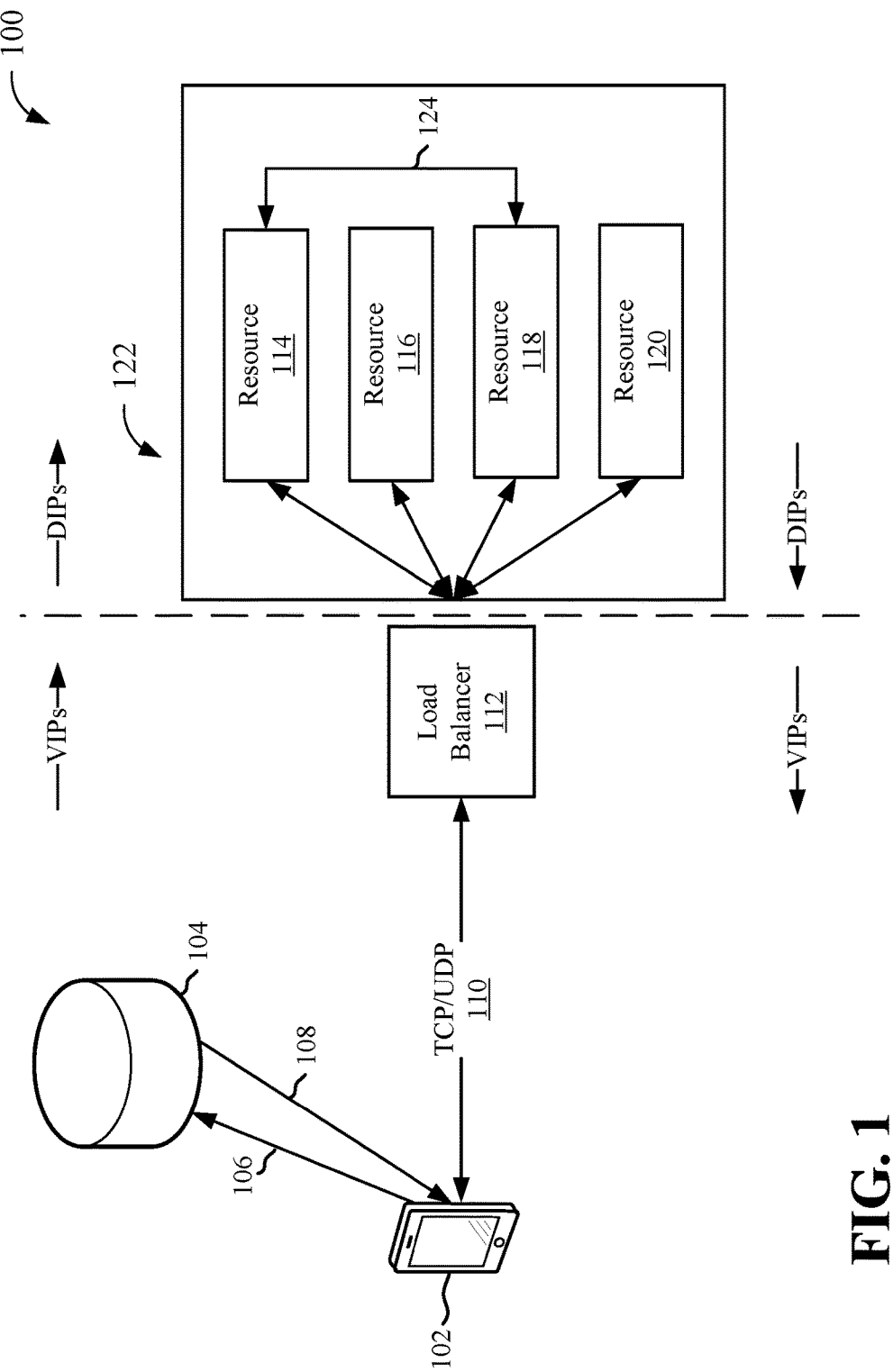
FIG. 1 depicts an example diagram of a client device in communication with one or more virtual resources via a load balancer.

FIG. 1 illustrates an example system 100 that includes a client device 102 in communication with a datacenter or other virtual platform 122. In one example, client 102, which may be representative of any device or origin of request for virtualized services provided by datacenter 122, may have some work to be performed by datacenter 122. In one example, client device 102 may communicate with a domain name system (DNS) 104 to obtain one or more virtualized IP addresses (VIPs) of a service or other process running in the datacenter 122. Client device 102 may send a lookup request for a particular service, application, or data managed by datacenter 122 at operation 106. The DNS 104 may look up the service or data associated with the request and return at least one VIP associated with the requested data, service, etc. The client device may then communicate with the datacenter 122, at operation 110. In some aspects, this may be over a TCP, UDP, or other communication protocol, as is known in the art.

The datacenter may implement a load balancer 112, which may distribute incoming traffic among resources or virtual machines (VM)s, or VM instances 114-120. As used herein, a VM instance may be an instantiation of a VM executing on a host device. Multiple instances of the same VM (e.g., same configuration, data, logic, etc.), may be executed concurrently on the same or different devices or hosts. In some aspects, the load balancer 112 may include a hardware component. In other cases the load balancer 112 may be implemented in software, e.g., as a software load balancer (SLB). As described in the rest of the disclosure, only an SLB will be described in detail. However, it should be appreciated that the techniques described herein may also be easily implemented in hardware load balancers as well. The load balancer 112 may convert data (e.g., packets) addressed to a VIP to a datacenter internet protocol address (DIP), for routing to one or more resources 114-120. The load balancer 112 may also provide outbound internet connectivity via translating packets destined for external locations, such as client device 102. In some cases, the load balancer 112 may also provide intra-datacenter routing, for example between any of resources 114, 116, 118, or 120, for example represented by link 124.

Figure 2:
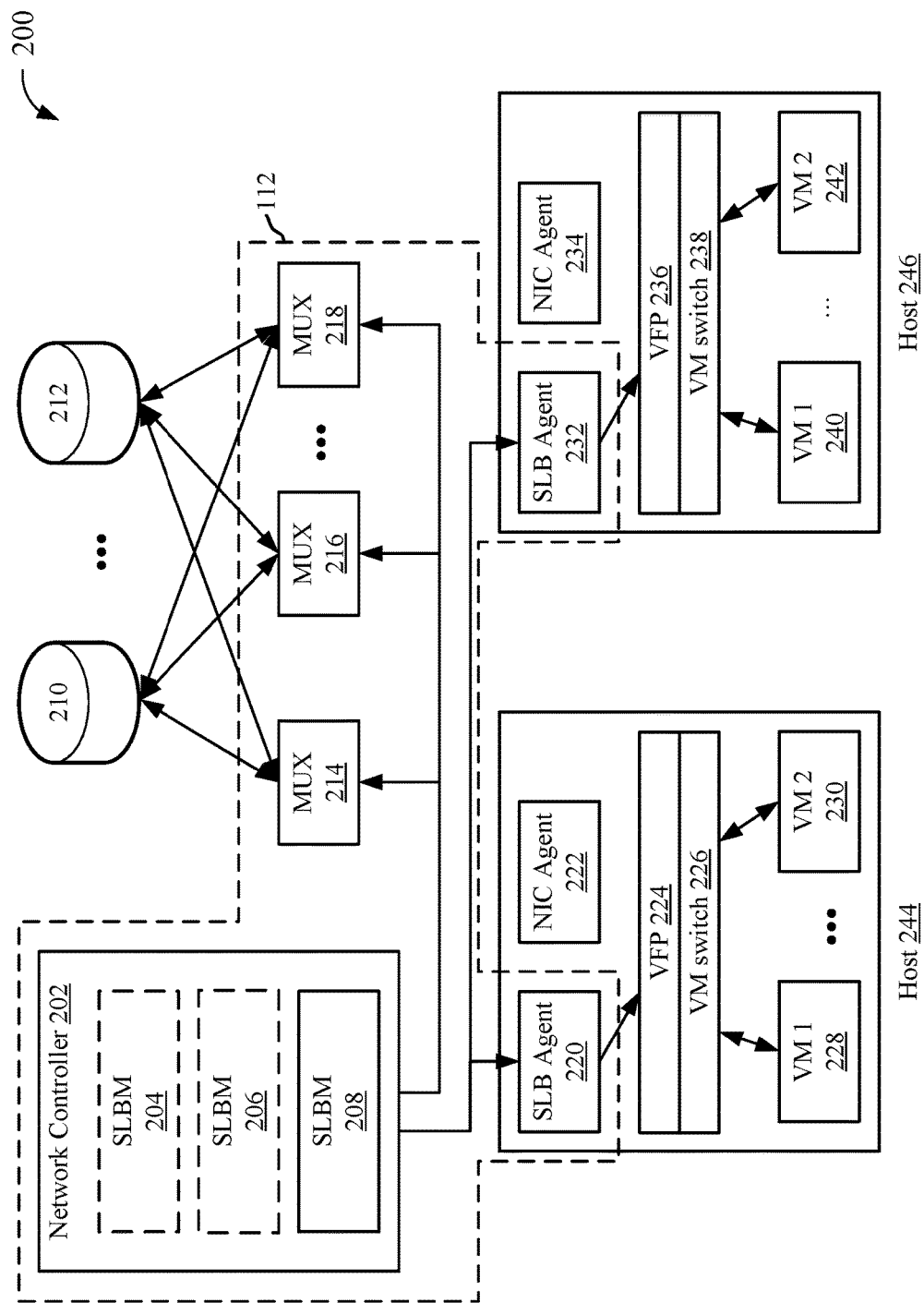
FIG. 2 depicts an example architecture of a software load balancer in communication with multiple virtual machines.

FIG. 2 illustrates an example data center 200, which may implement one or more software load balancers 112. Software load balancer (SLB) 112, as illustrated, is a distributed system that comprises multiple datacenter components that work in concert to perform load balancing and network address translation (NAT) functions.

In some aspects, load balancer 112 may include a network controller 202, which may control routing, addressing, and other aspects of datacenter 200/VMs. The network controller 202 may include one or more instances of a software load balancer manager (SLBM) 204, 206, 208. Each SLBM 204, 206, 208 may process SLB commands coming in through one or more APIs and be responsible for programming goal states. Each SLBM 204, 206, 208 may synchronize state between the different components in SLB 112. In some aspects, each SLBM 204, 206, 208 may be responsible for a certain number of VMs 228, 230, 240, 242, and/or a number of host devices 244, 246, and so on.

The network controller 202/SLBM instances 204, 206, 208 may communicate with one or more multiplexer (MUXes) 214, 216, 218. Each of MUXes 214, 218, 218 may receive traffic that is routed via routers 210, 212 using ToR or other anonymity network technique, for example that may receive traffic from one or more networks, such as the internet. In some aspects, the one or more routers 210, 212 may route inbound traffic to one or more MUXes 214, 216, 218 using equal-cost multi-path routing (ECMP). In some aspects, the one or more routers 210, 212 may communicate with MUXes 214, 216, 218 using Border Gateway Protocol (BGP). Each SLBM 204, 206, 208 may determine policies for distribution of traffic/requests to MUXes 214, 216, 218. Each SLBM 204, 206, 208, may also determine policies for routing data from MUXes 212, 214, 216 to one or more hosts 244, 246 (e.g., hyper-V enabled hosts). Each SLBM 204, 206, 208 may also manage VIP pools that map VIPs to DIPs of different VMs 228, 230, 240, 242, Each MUX 212, 214, 216 may be responsible for handling data. Each MUX 212, 214, 216 may advertise to router 210, 212 its own IP address as the next hop for all the VIPs it is associated with. MUXes 212, 214, 216 may receive traffic from the routers 210, 212 and may performed load balancing to map the traffic to available VMs 228, 230, 240, 242.

Each host device 244, 246, which may include various types and configurations of computing devices such as servers and the like, may execute or otherwise be associated with an SLB host agent 220, 232. Each SLB host agent 220, 232 may be responsible for programming rules on the hosts 244, 246. Each SLB host agent 220, 232 may also be the requesting port for SLBM 204, 206, 208 for outbound connections. Each SLB host agent 220, 232 may send health probes to VMs 228, 230, 240, 242 (e.g., addressed to a DIP associated with each VM, where the DIP is in the tenant's virtual network space) and receive responses from the VM concerning their health, status, etc., via one or more VM switches 226, 238. Each VM switch 226, 238 may be associated with a virtual machine filtering platform (VFP) to facilitate multitenant VM implementations. In some aspects, an NIC agent 222, 234, on each host 244, 246, may facilitate creation of a virtualized NIC from which the SLB host agent 220, 232 may send probe requests.

In some aspects, each host device 244, 246 may be associated with a hypervisor. In some aspects, SLB host agents 220 and 232 may execute via the hypervisor or Hyper-V host. Each SLB host agent 220, 232 may listen for SLB policy updates from controller 202/SLBM 204, 206, 208 and program rules to a corresponding VM switch 226, 238. VM switches 226, 238 may be designed to facilitate operations in a software defined network (SDN), and process the data path for SLB de-encapsulation and NAT. Switches 226, 238 may receive inbound traffic through MUXes 214, 216, 218, and route outbound traffic either back through MUXes 214, 216, 218 or directly to outside IPs, bypassing the MUXes 214 216, 218.

In some cases, DIP endpoints may not be virtualized, such as if they are associated with VMs that contribute to a datacenter's infrastructure. These DIPS may also be behind or work in conjunction with a load balancer and/or be live migrated. As used herein, a DIP endpoint may be virtualized or non-virtualized, and the described techniques may operate on both types of DIPs.

Inbound data flows will be described in reference to FIGS. 3 and 4, outbound flows will be described in reference to FIG. 5, and intra-datacenter flows will be described in reference to FIG. 6, below.

Figure 3:
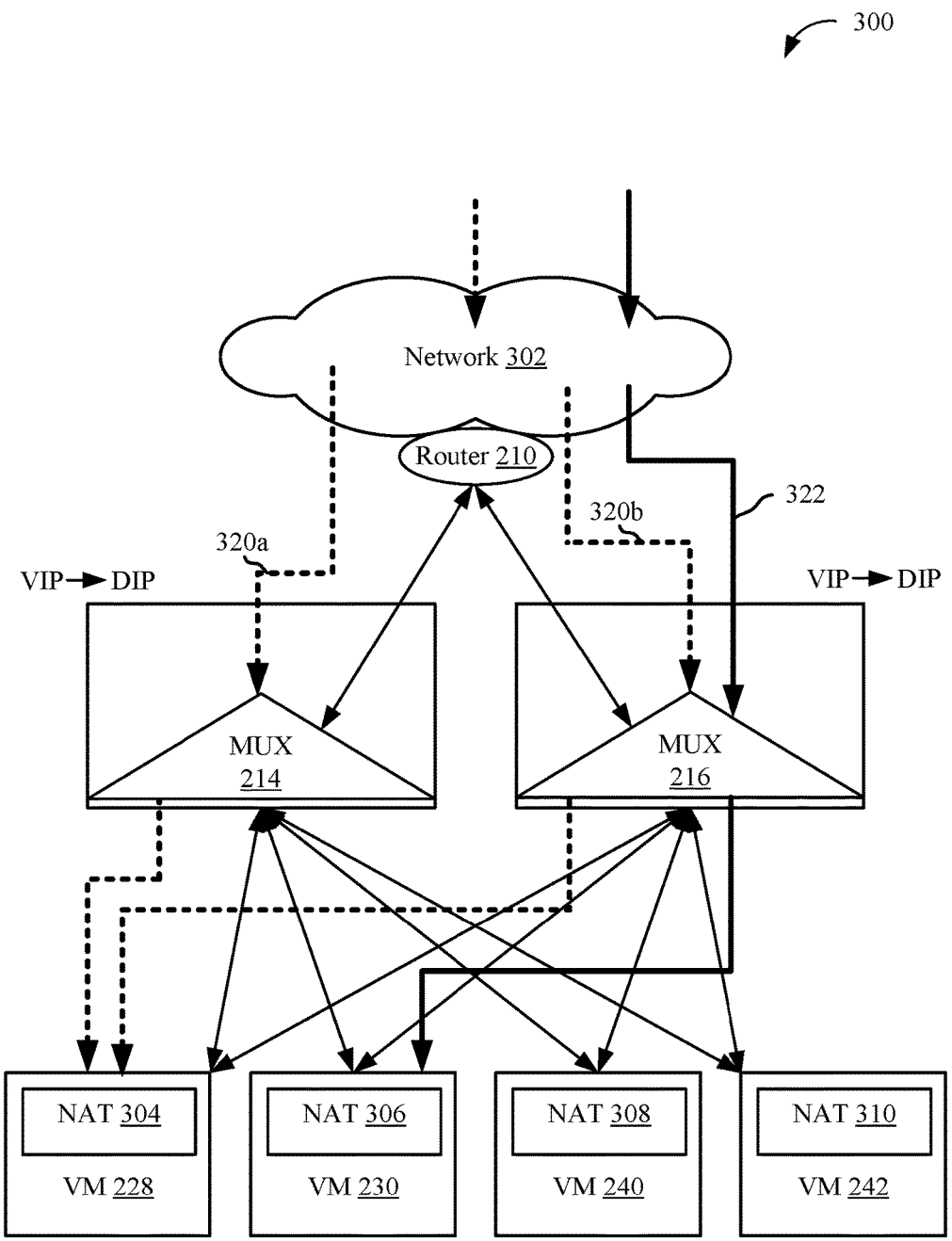
FIG. 3 depicts an example of inbound traffic to one or more virtual machines via a load balancer.

FIG. 3 depicts an example process flow 300 of inbound traffic to one or more virtual machines via a load balancer. A first connection or flow may be depicted as dotted line 320. In the example system illustrated, flow 320 may take two paths to arrive at VM 228, either through MUX 214 or through MUX 216, as represented by flows 320a and 320b. A second flow 322 may be directed at VM 230, and may be routed through MUX 216.

As illustrated, the top layer or first tier may include a network 302, such as the internet, and router 210, which may be responsible for distributing packets via ECMP to MUXes 214, 216, for example, on layer 3 of the data plane. The MUXes 214 and 216 may be on the second tier, and may provide encapsulation via translating VIPs to DIPS, to route data to one or more VMs 228, 230, 240, 242, on layer 4 of the data plane. As ECMP hashing may not be inherently stable, MUXes 214 and 216 may maintain a consistent hash to ensure packets from same flow get routed to the same server or VM. MUXes 214 and 216 may encapsulate packets via Virtual Extensible LAN (VXLAN) or Network Virtualization using Generic Routing Encapsulation (NVGRE) to a VM, such a associated with a DIP.

The VMs 228, 230, 240, 242 may be on the third tier, and may each employ NAT functionality 304-310, which may de-capsulate the packets received from MUXes 214, 215 and deliver them to the corresponding VM.

Figure 4:
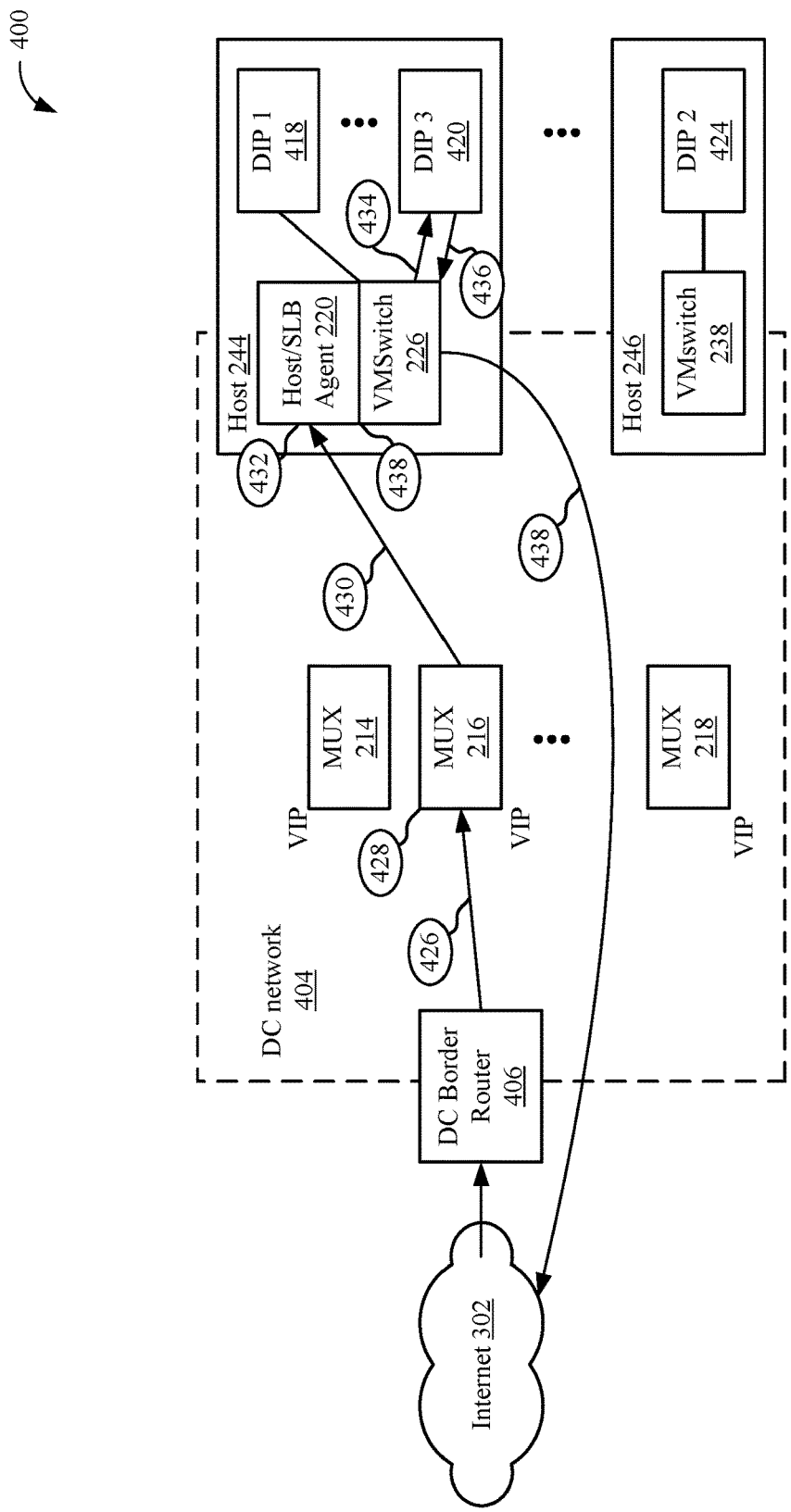
FIG. 4 depicts another example of inbound traffic to one or more virtual machines via a load balancer.

FIG. 4 depicts another inbound flow of data 400 to a datacenter/VMs managed by a load balancer, such as the software load balancer described above in reference to FIG. 2. Packets destined for a VIP may be load balanced and delivered to the DIP of a VM. When a VIP is configured, each MUX 214, 216 may advertise a route to its first-hop router, e.g., a datacenter (DC) border router 406, announcing itself as the next hop for that VIP. This causes the router(s) 406 to distribute packets, received via a network or the internet 302, destined for the VIP across all the MUX nodes 214, 216 based on ECMP, as depicted by operation 426. Upon receiving a packet, the MUX 216 may select a DIP for the connection based on one or more load balancing algorithms. The MUX 216 may then encapsulate the received packet setting the selected DIP as the destination address in the outer header of the packet, at operation 428. In some cases, the MUX 216 may encapsulate the packet using IP-in-IP protocol, VXLAN, NVGRE, or other similar protocol. The MUX 216 may then send the encapsulated packet using regular IP routing at the MUX 216, at operation 430.

In some cases, the MUX 216 and the DIP, here DIP x 420, do not need to be on the same VLAN, they may just have IP (layer-3) connectivity between them. The host agent or SLB agent 220, located on the same physical machine 224 as the target DIP, DIP3 420, may intercept this encapsulated packet, remove the outer header, and rewrite the destination address and port, at operation 432. In some aspects, the VFP 224, 236, which may be programmed by the SLB agent 220, 232, may intercept encapsulated packets. The SLB Agent 220 may record this NAT state. The SLB agent 220 may then send the re-written packet, via VM switch 226, to the VM associated with DIP3 420. The SLB host agent 220 may then send the rewritten packet to the VM, at operation 434.

When the VM sends a reply packet for this connection, at operation 436, it is intercepted by the SLB agent 220. The VFP 224, 236 (programed by the SLB Agent 220) may perform reverse NAT based on the state recorded at operation 432, and rewrite the source address and port, at operation 438. The SLB agent 220 may then send the packet out to the router 406 towards the source of the connection, at operation 438. The return packet may bypass the MUX 216, thereby saving packet processing resources and network delay. This technique of bypassing the load balancer on the return path may be referred to as Direct Server Return (DSR). In some cases, not all packets of a single connection would end up at the same MUX 216; however, all packets for a single connection must be delivered to the same DIP. Table 1 below shows an example of addressing of a packet through the flow described above. As described herein, IPs are presented for simplicity, but layer 4 translations, e.g. mapping VIP: PortA to DIP: PortB, can happen as part of load balancing and NAT.

TABLE 1

| Operation | Outer IP Address: Source | Outer IP Address: Destination | Original IP Address: Source | Original IP Address: Destination |
|---|---|---|---|---|
| 426 | | | Client DIP | VIP |
| 430 | MUX IP | Host physical or provider address | Client DIP | VIP |
| 434 | | | Client DIP | DIP3 |
| 436 | | | DIP3 | Client DIP |
| 438 | | | VIP | Client DIP |

Figure 5:
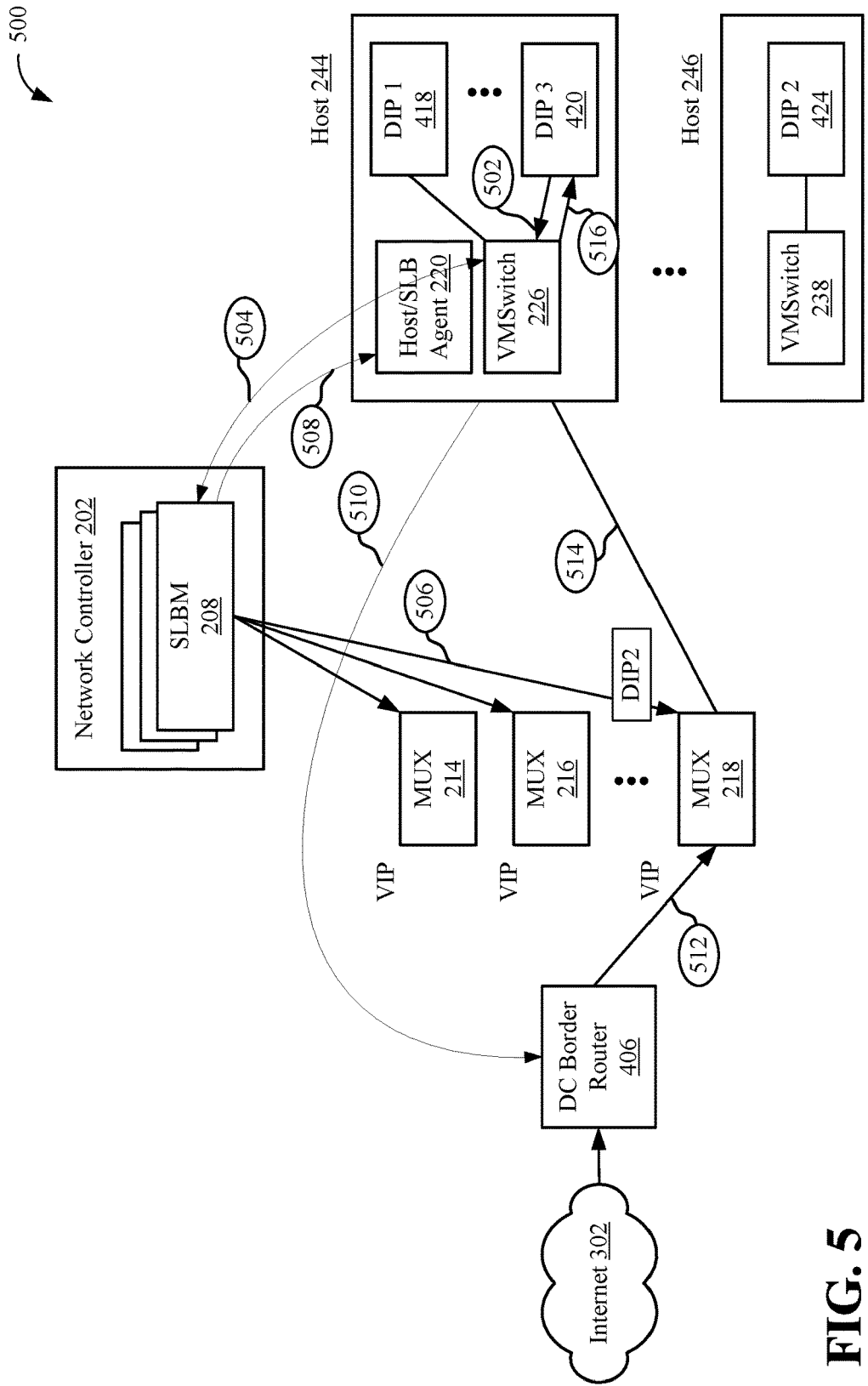
FIG. 5 depicts an example of inbound and outbound traffic to one or more virtual machines.

FIG. 5 depicts an example process flow 500 of outbound and inbound traffic to one or more virtual machines via a load balancer. From a high level, outbound traffic flow may be described in a few steps or operations. First, a host plugin or SLB agent 220 may first request a SNAT port from the SLBM 208. The SLBM 208 may configure a SNAT port on the MUXes 214, 216, 218 and provide the port configurator to the SLB agent 220. The SLB agent 220 may then program a NAT rule into a virtual switch/VFP to do the routing/ network address translation. The outbound process flow will now be described in more detail with more specific reference to FIG. 5.

In some aspects, the SLBM 208 may enable distributed NAT for outbound connections, such that even for outbound connections that need source NAT (SNAT), outgoing packets may not need to be routed through a MUX 214, 216, 218. Process 500 illustrates an example of how packets for an outbound SNAT connection are handled. A VM associated with a DIP, such as DIP3 420, may first send a packet containing its DIP as the source address, a destination port, and an external address as the destination address, at operation 502. The VFP 224, 236 may intercept the packet and recognize that the packet needs SNAT. The host/SLB agent 220 may hold the packet in a queue and send a message to SLBM 208 requesting an externally routable VIP and a port for the connection, at operation 504. SLBM 208 may allocate a VIP and a port, from a pool of available ports and configure each MUX 214, 216, 218 with this allocation, at operation 506. The SLBM 208 may then send this allocation to the SLB agent 220, at operation 508. The SLBM 208 may use this allocation to rewrite the packet so that its source address and port now contain a VIP and the designated ports. The SLBM 208 may send the rewritten packet directly to the router 406, at operation 510. The return packets from the external destination are handled similar to inbound connections. The return packet is sent by the router 406 to one of the MUXes 214, 216, 218, at operation 512. The MUX 218 already knows that DIP3 should receive this packet (based on the mapping in operation 506), so it encapsulates the packet with DIP3 as the destination and sends the packet to host 244, at operation 514. The SLB agent 220 intercepts the return packet, performs a reverse translation so that the packet's destination address and port are now DIP3 and a destination port. The SLB host agent 220 may then send the packet to the VM associated with DIP3 420, at operation 516. Table 2 below shows an example of addressing of a packet through the flow described above.

at the MUX pool. For VIP directed flows both originating and terminating within a datacenter, there is an opportunity to bypass the MUX.

In scenarios where the MUX is bypassed, the MUX may still own the decision of selecting a DIP endpoint to which to load balance a VIP destined packet. The MUX may communicate the selected DIP endpoint to the source of the VIP directed packet. The SDN switch at the source can then perform the transformations (e.g., packet addressing) that the MUX would have performed, and direct its packets directly to the host of the selected DIP endpoint. To the SDN switch at the host of the selected DIP endpoints, the packets arriving from the source SDN switch appear no different than the packets arriving from the MUX. As a result, processing at the destination SDN switch may proceed as usual, without any required implementation changes.

The source which wants to speak with the VIP endpoint therefore effectively bypasses the MUX, and packets directly flow from the Provider Address of the source (PAs) to the Provider Address of the destination (PAd) without passing the MUX. This reduces the bandwidth load on the MUX for intra-datacenter traffic and frees up the MUX to handle traffic coming from/directed to internet endpoints.

In some cases, in order to scale to the bandwidth requirements of intra-datacenter traffic, the traffic may be offloaded to end systems or distributed, via a process referred to herein

TABLE 2

| Operation | Outer IP Address: Source | Outer IP Address: Destination | Original IP Address: Source | Original IP Address: Destination | Source port (TCP/UDP) | Destination port (TCP/UDP) |
|---|---|---|---|---|---|---|
| 502 | | | DIP3 | Client DIP | Dynamic port | Client port |
| 504 | | SLBM to lease VIP port | | | VIP port | |
| 510 | | | VIP | Client DIP | VIP port | Client port |
| 512 | | | Client DIP | VIP | Client port | VIP port |
| 514 | Load Balanced IP | Host physical or provider address | Client DIP | VIP | Client port | VIP port |
| 516 | | | Client DIP | DIP3 | Client port | Dynamic port |

In some aspects, internet VIPs may be shared for outbound traffic amongst VMs in the cloud service/datacenter. One or more ports may be pre-allocated per DIP to ensure a min guaranteed outbound connections, whereas the rest of the ports may be allocated dynamically. In some cases, port allocation may be optimized to maximize concurrent connections to different destinations.

Figure 6:
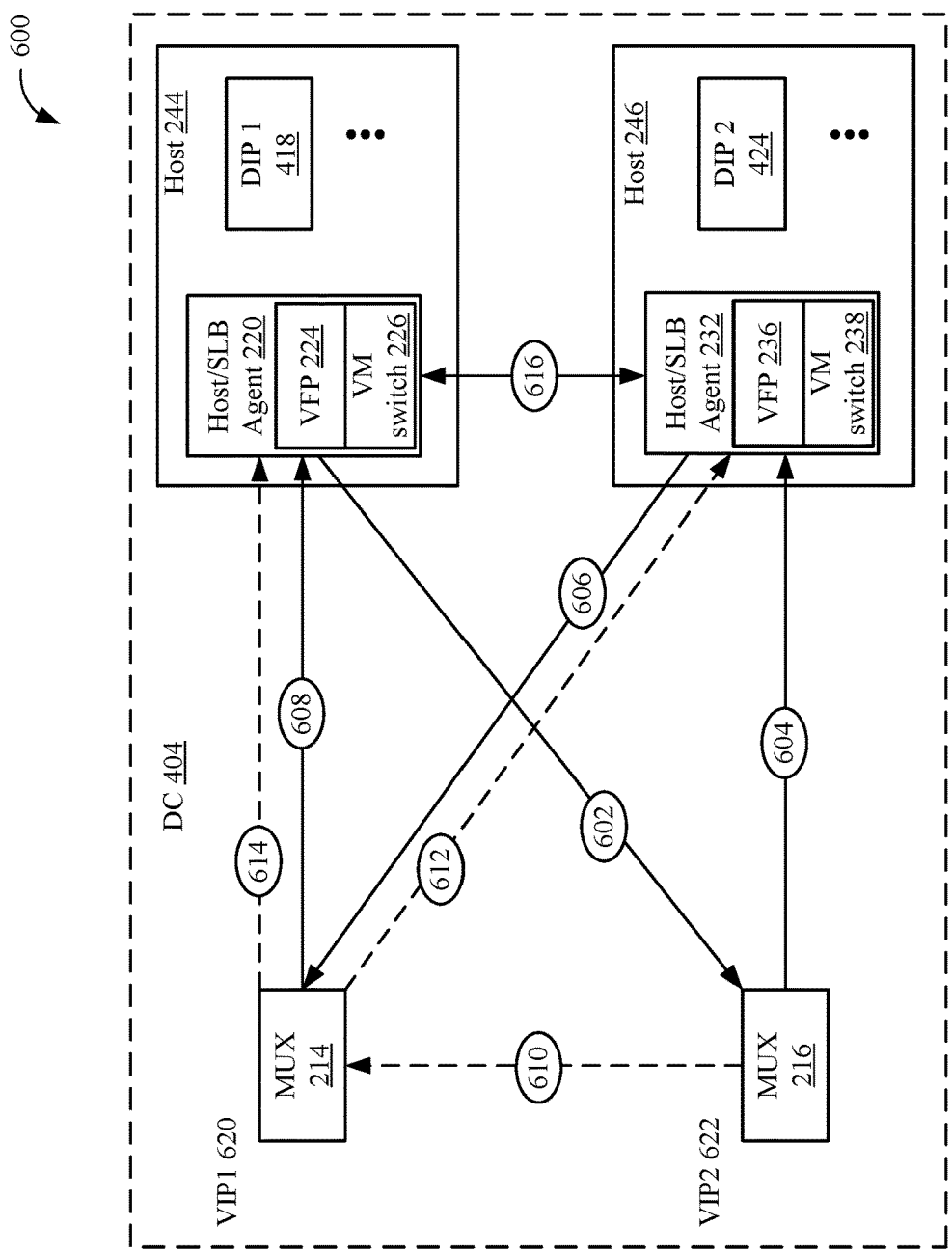
FIG. 6 depicts an example of an intra-datacenter traffic bypass between two virtual machines.

FIG. 6 illustrates an example process flow 600 of intra-datacenter or east to west (EW) traffic between virtual machines behind a load balancer.

When a packet is directed to a load balanced VIP endpoint, it arrives at a load balancer MUX. The load balancer MUX is responsible for load balancing the incoming connection to a virtualized Datacenter IP address (DIP). The MUX therefore owns the load balancing decision and for that reason, all packets addressed to a virtualized endpoint must pass over the MUX. As a result, the MUX becomes the choke point of the network in terms of bandwidth. This can be ameliorated by having a pool of MUXes where each MUX instance has similar state. The incoming packets may be distributed to these MUXes; however it is still desirable to not have every packet pass through the MUX pool in order to conserve the packet processing bandwidth available as Fastpath or EW traffic bypass. For EW traffic, the load balancer may determine which DIP a new connection should go to when the first packet of that connection arrives. Once this decision is made for a connection, it may be persisted. As a result, DIP information can be sent to the host or SLB agents on the source and destination hosts so that they can communicate directly. This results in the packets being delivered directly to the host machine hosting one or more DIP VMs, bypassing the MUXin both directions, thereby enabling communication at full capacity supported by the underlying network. This change in routing may be made transparent to both the source and destination VMs.

In one example, two services 620 and 622, provided by datacenter 404, may be assigned virtual addresses VIP1 and VIP2, respectively. These two services 620 and 622 communicate with each other via VIP1 and VIP2 using processes for load balancing and SNAT described above. In the example process flow 600, a packet flow for a connection may be initiated by a VM DIP1 418 (belonging to service 1) to VIP2 622. The source host 244 of DIP1 418 may perform SNAT on the TCP SYN packet using VIP1 and send it to VIP2, at operation 602. This packet may be delivered to MUX 216, which forwards the packet towards destination DIP2 424, at operation 604. When DIP2 424 replies to this packet, it is SNAT'ed by the destination host 246 using VIP2 and sent to MUX 214, at operation 606. MUX 214 uses its SNAT state and sends this packet to DIP1 418, at operation 608. Subsequent packets for this connection follow the same path.

Each MUX 214, 216 may be configured with a set of source and destination subnets that are capable of Fastpath. Once a connection has been fully established (e.g., TCP three-way handshake has completed) between VIP1 620 and VIP2 622, MUX 216 may send a redirect message to VIP1 620, informing it that the connection is mapped to DIP 2 424, at operation 610. This redirect packet goes to MUX 214 handling VIP1 620, which looks up its table to know that this port is used by DIP1 418. MUX 214 may then send a redirect message to the hosts 244 and 246 of DIP1 418 and DIP2 424, respectively, at operations 612 and 614. The redirect messages may be intercepted by the host/SLB agent 220, 232/VFPs 224, 236 running within the vSwitch port corresponding to the DIP VMs 418, 424. The VFPs 224, 236 may create a flow state for the port such that further packets in the flow destined to VIP 622 are sent directly to host 246 by VFP 224 of host 244 for DIP 418. The host/SLB host agent 220, 232 are each responsible for configuring a rule such that the port is able to intercept a redirect packet from the MUX 214, 216 and create flow state necessary to bypass the MUX 214, 216

The work done by VFP 224, 236 on bypassed flows makes the packet look exactly as it would have after leaving the MUX 214, 216 (outer packet is directed to PA address corresponding to host 246 and inner MAC corresponding to DIP 424), therefore the processing at VFP 236 running within the vSwitch port corresponding to DIP VM 424 is indifferent to the fact that this packet is arriving on a bypassed flow.

The host agent 220 on the source host 244 may intercept the redirect packet and determine that this connection should be sent directly to DIP2 424. Similarly, host agent 232 on the destination host 246 may intercept the redirect message and determine that this connection should be sent to DIP1 418. Once this exchange is complete, any future packets for this connection are exchanged directly between the source host 244 and destination host 246 directly, at operation 616.

Figure 7:
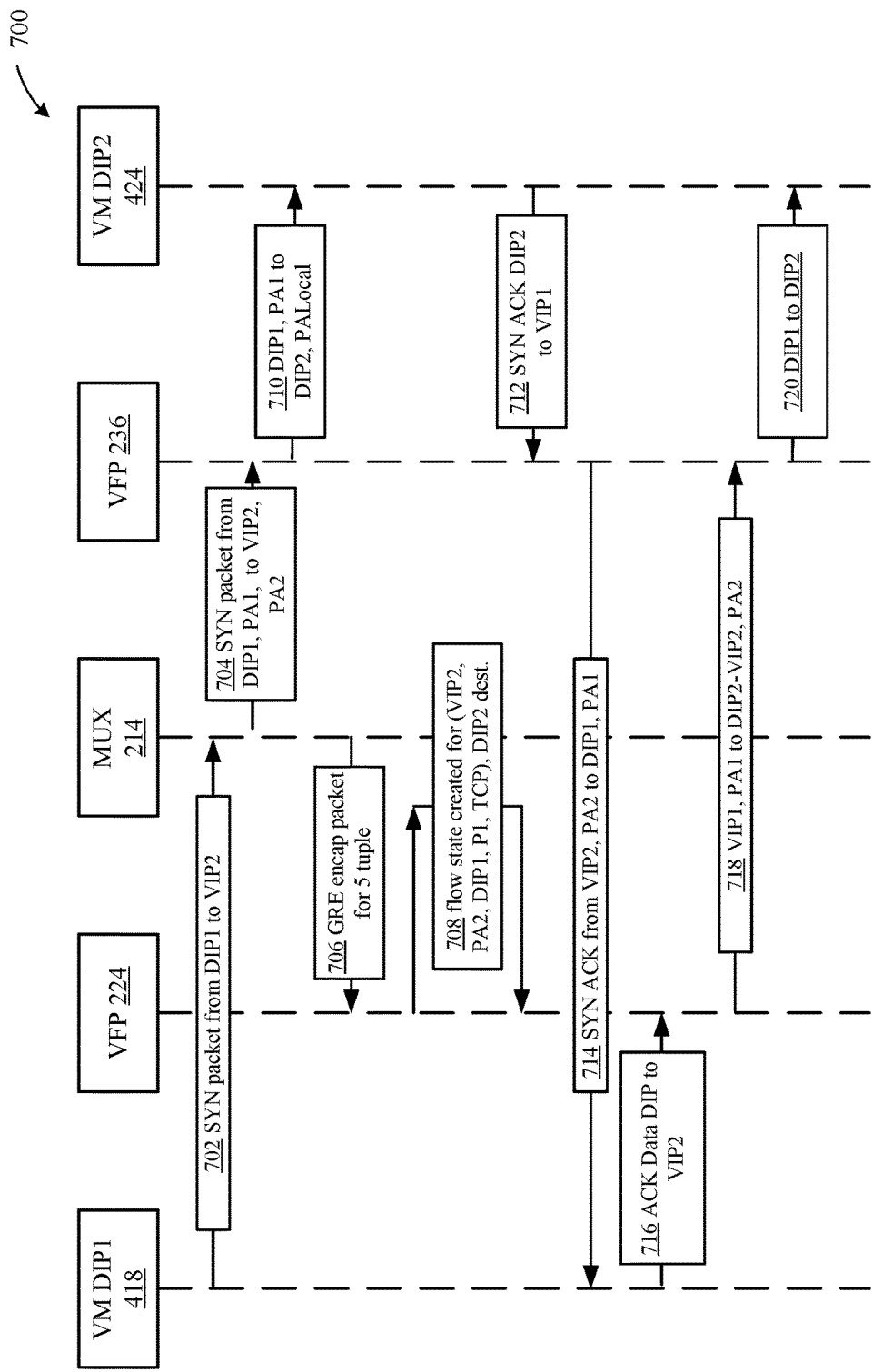
FIG. 7 depicts example communications between two virtual machines to establish an intra-datacenter traffic bypass.

FIG. 7 illustrates an example communication exchange or process 700 between two VM DIPs 418 and 424 utilizing a single MUX 214 to establish an EW traffic bypass.

Process 700 may begin with VM DIP1 418 sending a SYN packet from DIP1 to VIP2 at operation 702. VFP 224 transforms the packet so that the packet is addressed from VIP1 to VIP2 (e.g., it performs SNAT to transform the source DIP1 to VIP1). Operation 702 may require no encapsulation. The SYN packet may be routed through MUX 214, which may encapsulate the packet, at operation 704 to be from DIP1, PA1, to VIP2, PA2. The MUX 214 may select a special source IP address, such as the MUX PA1, which may be the same as the SLBM self VIP. The outer destination IP may be the PA of the host containing DIP2 424, such as PA2. VFP 236, associated with host 246/DIP2 424 may receive the packet, and at operation 710, re-encapsulate the packet to be DIP1, PA1 to DIP2, PALocal. After operation 702 or 704/in some cases, concurrently with the performance of operation 710, the MUX 214 may send a generic routing encapsulation (GRE) encap packet for 5 Tuple that identifies a flow at L4, or any set of fields that help identify a flow or configured communication channel to VFP 224 associated with VM DIP1 418, at operation 706. In some cases, operation 706 may include sending some other flow identifiers, for example, L3 only flows, such as ICMP, which may have another set of identifiers compared to L4. The VFP 224 may create a flow state for (VIP2, PA2, DIP1, PA1, TCP) with DIP2 as the destination, at operation 708. VM DIP2 424 may, after operation 710, send a SYN ACK packet addressed from DIP2 to VIP1 at operation 712, to VFP 236. Operation 712 may not require encapsulation. VFP 236 may then send a SYN ACK packet addressed to VIP1, which may be intercepted by MUX 214, at operation 714. Operation 714 may also include MUX 214 routing the packet to DIP1 (via a SNAT procedure similar to operation 702), via encapsulation, with the outer address selected as MUX special source IP address to the PA corresponding to the host of DIP1, or from VIP2, PA2 to DIP1, PA1, of VM DIP1 418. VM DIP1 418 may then respond by sending an ACK data packet addressed from DIP1 to VIP2 at operation 716. VFP 224 may intercept the ACK data packet, and retransmit the packet, addressed to DIP2-VIP2, PA2, from VIP1, at operation 718. VFP 236 may receive this packet and re-address it to DIP2, at operation 720. VM DIP2 424 may receive the packet, upon which a MUX bypass channel is fully established.

When a DIP endpoint is live migrated, the PA of the node hosting it (e.g., host) on the underlay network changes. For example, PAd changes to PAd1. All the flows which had previously bypassed the MUX to reach the SDN switch corresponding to the DIP endpoint will now reach the previous host/SDN switch corresponding to the DIP.

In the live migration scenario, there needs to be a mechanism that informs all the hosts in the datacenter about the live migration of a DIP workload. In absence of such a mechanism, it is infeasible to use the EW optimization in a datacenter where tenant workloads will be live migrated. This will have a huge negative impact on the throughput of traffic flowing through the load balancer within the datacenter.

Currently, the load balancer MUX does not maintain state for flows which it has directly programmed the two (host) SDN switches involved in the EW communication. Maintaining state is non-trivial mainly because the MUX is not aware for how long a flow will continue after the MUX has programmed the two SDN switches (e.g., the flow could last for hours or conclude in a few seconds). To work around this limitation (lack of any central knowledge regarding which flows are currently bypassing the MUX), the SLBM component in the SDN controller may send a notification to all hosts in the datacenter that a live migration has occurred, regardless of whether each of the hosts have any bypassed flows which involve the live migrating VM. This technique, while effective, has the drawback that many notifications will be generated for hosts that don't contain any tenant workloads currently communicating with the live migrating VMs.

Another solution to the problem of notifying MUXes when a live migration has occurred, to update intra-datacenter flows, is described below.

Figure 8:
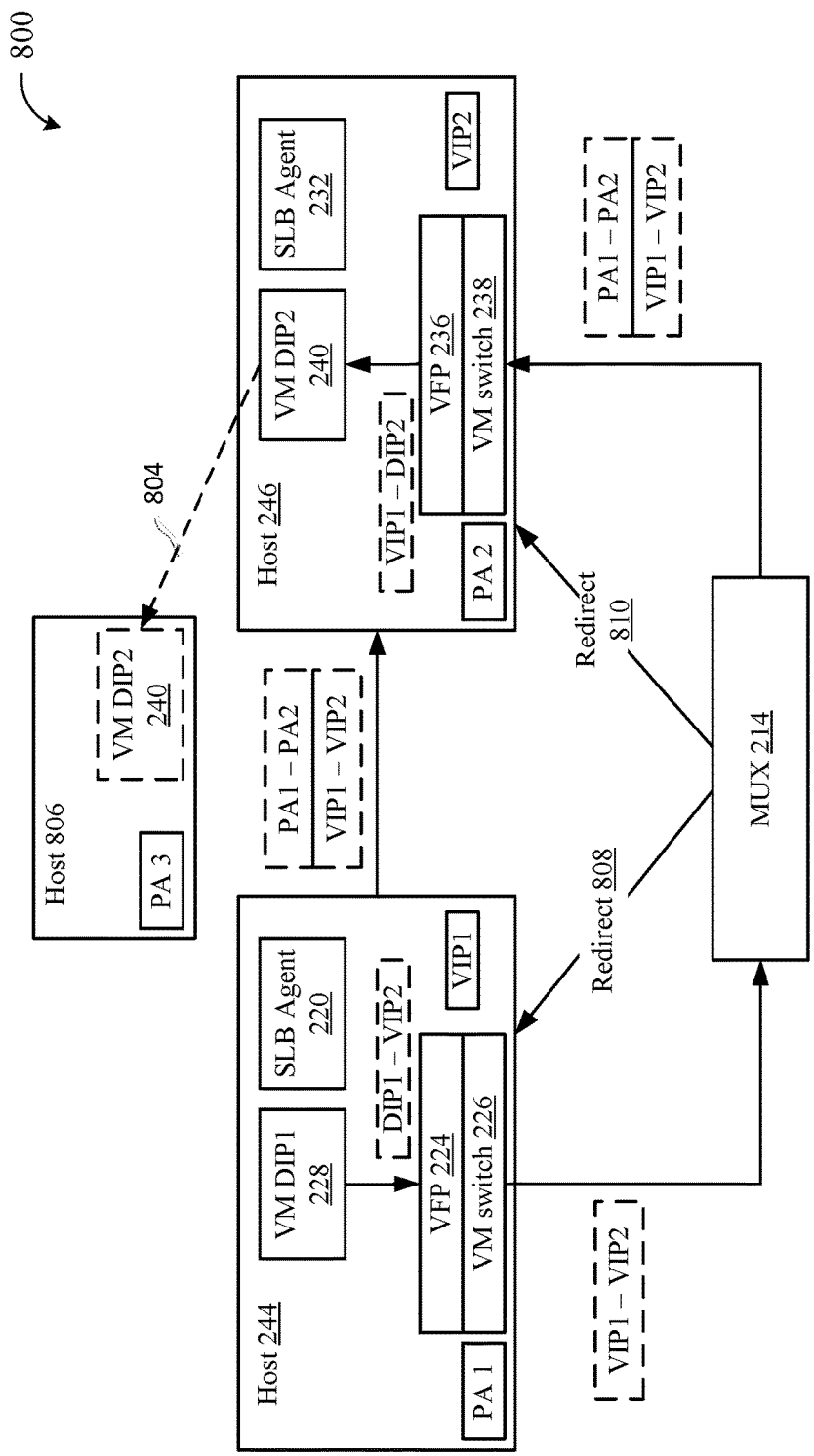
FIG. 8 depicts an example of an intra-datacenter traffic bypass between two virtual machines optimized for live migration of one of the virtual machines.

FIG. 8 illustrates an example system 800 that may implement a process for informing relevant VMs of live migration to update EW traffic bypass data flows. System 800 may include two hosts 244 and 246, each providing a virtual machine, VM DIP1 228, and VM DIP2 240, respectively. Each host 244 and 246 may be part of a datacenter, and may be behind a load balancer or MUX, such as MUX 214. Host 244 may be associated with a PA1, whereas host 246 may be associated with a PA2 and a VIP2. Host/VM DIP1 228 may be associated with a VIP, such as VIP1, whereas host 246/VM DIP2 240 may be associated with VIP2.

In one example, VM 228 may have one or more packets to send to VM 240. In this scenario, VM DIP1 228 may address the packet to VIP2, with a source of the packet being DIP1. The VFP 224/VM switch 226 associated with host 244, may NAT the packet so that it is sourced from VIP1. Host 244 may communicate this revised packet to MUX 214. MUX 214 may select a DIP endpoint to load balance to, such as DIP2. The MUX 214 may additionally modify the MAC on the inner packet to correspond to the chosen DIP. The MUX 214 may then encapsulate the packet choosing a special address as the PA source, PA1 (also a VIP—the SLBM self VIP) and the PA of the chosen DIP's host as the target, P2. Upon receiving the packet, the VFP 236/VM switch 238 of host 246 may perform another NAT function on the packet, and address the packet to DIP2, to deliver the packet to VM DIP2 240.

Figure 9:
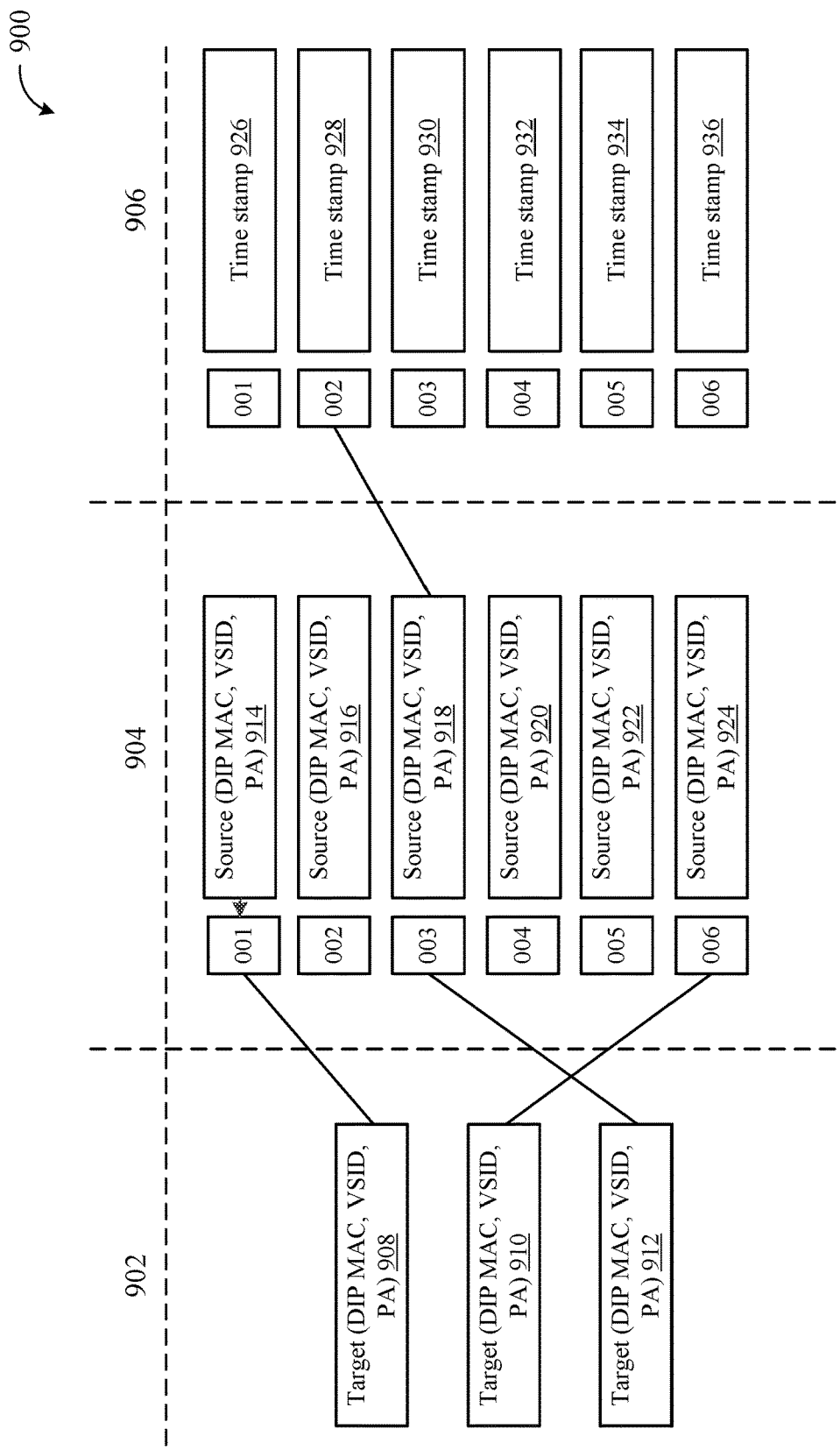
FIG. 9 depicts an example data structure for managing east west traffic bypass of a load balancer.

MUX 214 may facilitate creating a MUX bypass for this communication route, resulting in a direct route 802 between host 244 and host 246, with PA1, VIP1 as the source and PA2 and VIP2 as the destination. In some aspects, establishing the bypass communication route may be performed according to process 600. This may include sending the re-route information to at least the host 244/SLB agent 220, and in some cases, host 246/SLB agent 232, as well. The MUX 214, or the load balancer of which the MUX 214 is a component, may establish a bypass data structure or table that associates source identification information and destination identification information. The source identification information may include both source host and source VM information, and the destination identification information may include both destination host and destination VM information. This data table may be replicated across all MUX instances of the load balancer, for example, with the use of a distributed systems platform such as Service Fabric which provides replication of data across nodes. FIG. 9 illustrates an example bypass data structure 900.

Example data structure 900 may include target or destination information 902, which is linked to source information 904 for a bypass. The source information 904 may be further linked to an indication 906 of whether the bypass between a given target and a source is active. In one example, the indication may include a timestamp, for example indicating the last time the bypass was used or updated, for example by one of the source or target VMs. In one example, each of the target/destination and source identification information may include a identifier associated with the corresponding DIP, the VIP, and the PA. In some aspects, the DIP identifier may include a medium access control layer (MAC) address. In some examples, the VIP information may include a tenant network identifier (TNI), such as a virtual subnet ID (VSID). A virtual subnet may implement layer 3 IP subnet semantics for VMs in the same virtual subnet or broadcast domain. The VSID may be unique within the data center and may identify a virtual subnet.

In one example of data structure 900, a first hash table 902 is keyed by the DIP MAC, VSID and Provider Address (PA, i.e. the underlay address) corresponding to the target of flow which is still in use. The first hash table 902 stores a second hash table 904 as its value. The second hash table 904 too is keyed similarly, such as to a combination of DIP MAC, VSID and Provider Address (PA) corresponding to the source of flow. The value stored in this inner hash table 906 is a timestamp. In one example, target information 910 may be linked to source information 918, which may be linked to a timestamp 928. It should be appreciated that data structure 900 is only given by way of example, such that other organizations of data structure 900 specifying a bypass data flow are contemplated herein, include using different information to identify the source and destination VMs, host devices, and traffic flows.

In one example, an integer TTL field may be maintained in the inner hash table, as opposed to a time stamp. The TTL field may be uniformly decremented by n units after the passage of n seconds by a worker thread. This way, accounting for time drifts when this information is replicated across the mux pool, is not necessary. Updates from hosts may then include either the raw TTL value, or by how much to increment the current TTL. Allowing hosts to have some control over the pacing of the updates, such as updates corresponding to longer running flows, may bear successively larger TTLs and correspondingly increasing update intervals from the hosts. In some cases, batching of such updates from the host either at the per port level or even per host level may be implemented. This way the number of flow keep alive messages exchanged between the MUX and the hosts can be reduced.

Referring back to FIG. 8, periodically a host, such as host 244 which has an active bypassed flow, may update MUX 214 (or any other MUX in the MUX pool) that it is still using the flow. While sending an update packet, the host 244 may communicate the target DIP's MAC, VSID and its hosting DIPs PA to the MUX 214, as well as its own PA VSID and MAC. The MUX 214 may look up the relevant hash table 902 using the fields identifying the target. In this inner hash table 904, the MUX 214 then looks up the key from the fields corresponding to the source and updates the timestamp 906.

In some cases, a periodic thread or process within a MUX instance 214 may expire or deletes entries from inner hash tables which haven't had a heartbeat (e.g., have not been updated) for a configurable amount of time.

When a live migration occurs at operation 804, for example of one or both of VM DIP1 228 and VM DIP2 240, to a different host 806, the MUX 214 may examine the live migrated DIPs MAC (e.g., as illustrated VM DIP2 240) and search to find a key in the hash table 902 corresponding to that DIP MAC. If the DIP MAC corresponding to DIPS 240 exists in the table (e.g., in first hash table 902), and differs from the live migrated DIP MAC only by the PA (e.g., PA 3 instead of the prior PA2), then the MUX 214 may conclude that DIP2 240 is live migrating. The MUX 214 may then search through the keys of the inner hash table 904. These keys, which are associated with the target DIP MAC, VSID, and PA, identify hosts which have active bypassed flows that have the migrating DIP as their target. The MUX 214 may update these entries or flows to indicate the new host's PA. The MUX 214 may the send a redirect message to these hosts to update the PA address they have in their flows to the new PA address for the DIP (after live migration), at operation 808 and 810. In some cases the redirect message may be implemented using internet control message protocol (ICMP), with additional fields such as destination PA, destination MAC etc., contained in custom fields in the ICMP packet.

Figure 10:
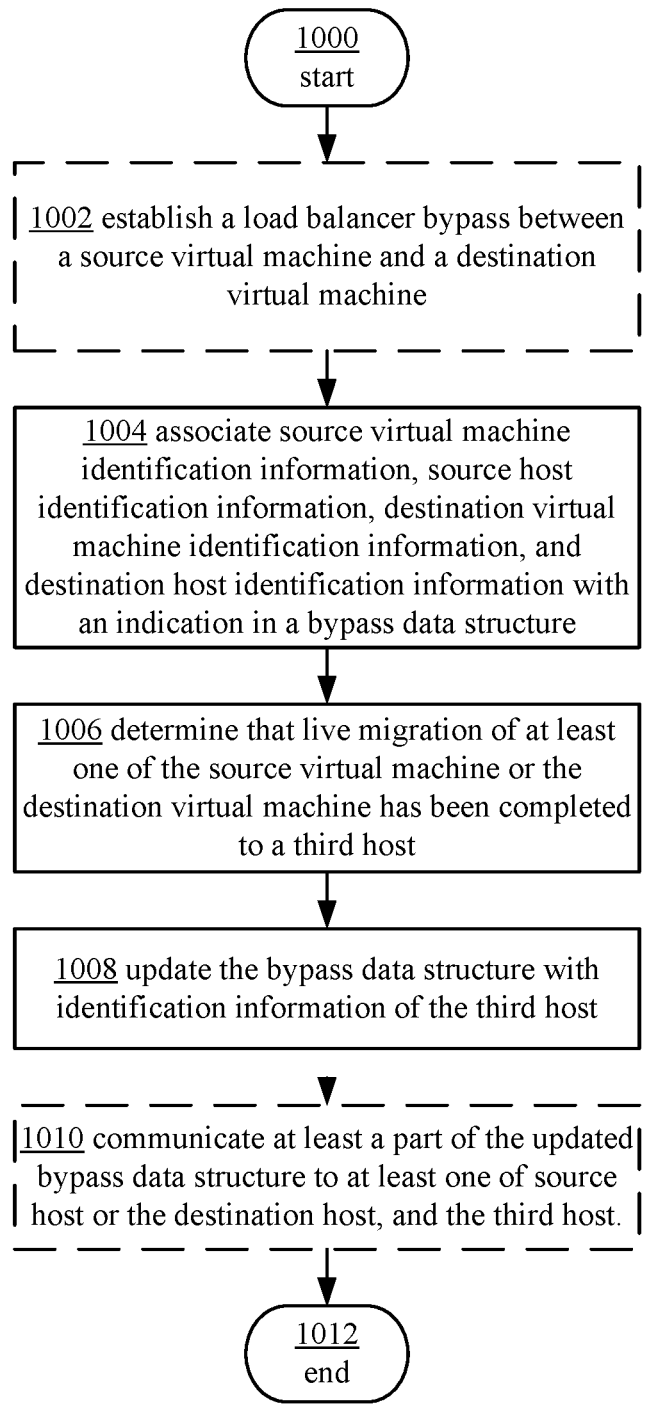
FIG. 10 depicts an example process for managing a load balancer bypass between two virtual machines through live migration of at least one of the two virtual machines, the method comprising.

FIG. 10 illustrates an example process 1000 for managing a load balancer bypass between two virtual machines through live migration of at least one of the two virtual machines. Process 1000 may be performed by a load balancer, such as load balancer 112, one or more aspects of a software load balancer (SLB), such as an SLB manager 208, SLB agents 220, 232, VM switches 226, 238 and/or VFP 224, 236, and/or MUXes 214, 216, 218, and/or VMs 228, 230, 240, 242. In one aspect, one or more MUXes and/or load balancer 112 may perform a majority or all of the operations of process 1000.

As illustrated, and used in this disclosure, a dotted line may indicate that an operation or component is optional, such that the described techniques may implemented without the indicated operations or components.

As illustrated, process 1000 may begin at operation 1002, in which a load balancer bypass may be established between a source virtual machine associated with a source host and a destination virtual machine associated with a destination host. In some cases operation 1002 may include one or more aspects process 600, 700, and/or 800 described above. In some cases, operation 1002 may be optional, such that a load balancer or MUX may become aware of a bypass without directly establishing or configuring the bypass. This may occur, for example, when a first MUX establishes the bypass and is subsequently taken offline, and another MUX may take over the operations of the offline MUX.

In the first case described above, the MUX or load balancer may associate source virtual machine identification information, source host identification information, destination virtual machine identification information, and destination host identification information with an indication of whether the bypass is active, in a bypass data structure. In some cases, the bypass data structure may take the form of data structure 900 described above. For example, the bypass data structure may include a first hash table keyed to the destination virtual machine identification information and the destination host identification information. The first hash table may contain a second hash table keyed to the host virtual machine identification information and the source host identification information. The second hash table may contain the indication. The indication may include a timestamp corresponding to the last time the bypass entry was updated by one of the source host or the destination host. In some implementations, the MUX may periodically examine each timestamp to determine outdated or unused bypasses. This may include comparing the timestamp with a configurable time period threshold. If the timestamp is too old, such that it places the last use or update of a bypass outside of the time threshold, the bypass entry may be deleted by the MUX, for example, to conserve memory space used by the MUXes/load balancer to maintain bypasses.

In other cases, the data structure of table may take other forms, so long as source and destination identification information is associated with some indication of whether the bypass is active. In the second case described above, a MUX may inherit or obtain this data structure, without actively creating or modifying it, for example via a load balancer or load balancer manager (e.g., an SLBM).

Next, at operation 1006, the load balancer or MUX may determine that live migration of at least one of the source virtual machine or the destination virtual machine has been completed to a third host. In some aspects, operation 1006 may include determining that the source host identification information or the destination host identification information has changed without a corresponding change in the source virtual machine identification information or the destination virtual machine identification information. This may include a change in the PA of the host, without a corresponding change on the DIP MAC, as described above in reference to FIG. 8.

Next, at operation 1008, the bypass data structure may be updated or modified with identification information of the third host, to maintain the load balancer bypass after completion of the live migration. Operation 1008 may include searching through the bypass data structure or table and updating any instance of the pre-migration PA of the migrated host that is associated with the migrated DIP.

In some aspects, process 1000 may further include operation 1010, in which at least a part of the updated bypass data structure may be communicated to at least one of source host or the destination host (e.g., the host associated with the DIP that was not migrated), and the third host. In some cases, at least part of the updated bypass table may be communicated to both the pre-migration source and destination host.

In some aspects, process 1000 may enable or include transmitting at least one data packet from the first source virtual machine to the destination virtual machine according to the updated bypass data structure, for example after live migration of at leas tone of the source or destination host has been completed.

Figure 11:
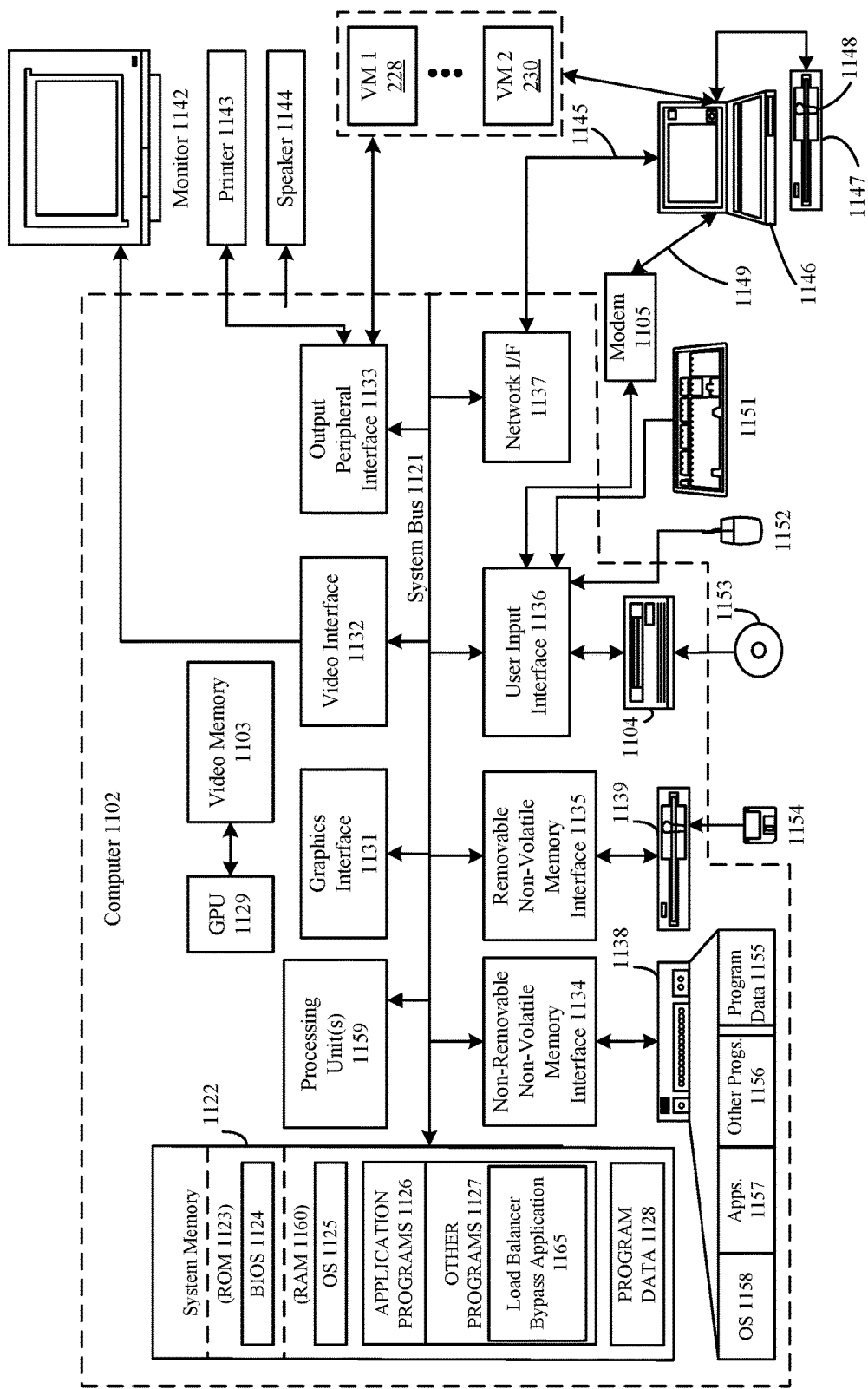
FIG. 11 depicts an example general purpose computing environment in which the techniques described herein may be embodied.

The techniques described above may be implemented on one or more computing devices or environments, as described below. FIG. 11 depicts an example general purpose computing environment, for example, that may embody one or more aspects of load balancer 112, SLBM 208, network controller 202, SLB agent 220, 232, NC agent 234, VM switch 226, 238, VFP 224, 236, MUX 214, 216, 218, or VM 228, 230, 240, 242, in which some of the techniques described herein may be embodied. The computing system environment 1102 is only one example of a suitable computing environment and is not intended to suggest any limitation as to the scope of use or functionality of the presently disclosed subject matter. Neither should the computing environment 1102 be interpreted as having any dependency or requirement relating to any one or combination of components illustrated in the example operating environment 1102. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1102, which may include any of a mobile device or smart phone, tablet, laptop, desktop computer, or collection of networked devices, cloud computing resources, etc., typically includes a variety of computer-readable media. Computer-readable media can be any available media that can be accessed by computer 1102 and includes both volatile and nonvolatile media, removable and non-removable media. The system memory 1122 includes computer-readable storage media in the form of volatile and/or nonvolatile memory such as read only memory (ROM) 1123 and random access memory (RAM) 1160. A basic input/output system 1124 (BIOS), containing the basic routines that help to transfer information between elements within computer 1102, such as during start-up, is typically stored in ROM 1123. RAM 1160 typically contains data and/or program modules that are immediately accessible to and/or presently being operated on by processing unit 1159. By way of example, and not limitation, FIG. 11 illustrates operating system 1125, application programs 1126, other program modules 1127 including a load balancer bypass application 1165, and program data 1128.

The computer 1102 may also include other removable/non-removable, volatile/nonvolatile computer storage media. By way of example only, FIG. 11 illustrates a hard disk drive 1138 that reads from or writes to non-removable, nonvolatile magnetic media, a magnetic disk drive 1139 that reads from or writes to a removable, nonvolatile magnetic disk 1154, and an optical disk drive 1104 that reads from or writes to a removable, nonvolatile optical disk 1153 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1138 is typically connected to the system bus 1121 through a non-removable memory interface such as interface 1134, and magnetic disk drive 1139 and optical disk drive 1104 are typically connected to the system bus 1121 by a removable memory interface, such as interface 1135 or 1136.

The drives and their associated computer storage media discussed above and illustrated in FIG. 11, provide storage of computer-readable instructions, data structures, program modules and other data for the computer 1102. In FIG. 11, for example, hard disk drive 1138 is illustrated as storing operating system 1158, application programs 1157, other program modules 1156, and program data 1155. Note that these components can either be the same as or different from operating system 1125, application programs 1126, other program modules 1127, and program data 1128. Operating system 1158, application programs 1157, other program modules 1156, and program data 1155 are given different numbers here to illustrate that, at a minimum, they are different copies. A user may enter commands and information into the computer 1102 through input devices such as a keyboard 1151 and pointing device 1152, commonly referred to as a mouse, trackball or touch pad. Other input devices (not shown) may include a microphone, joystick, game pad, satellite dish, scanner, retinal scanner, or the like. These and other input devices are often connected to the processing unit 1159 through a user input interface 1136 that is coupled to the system bus 1121, but may be connected by other interface and bus structures, such as a parallel port, game port or a universal serial bus (USB). A monitor 1142 or other type of display device is also connected to the system bus 1121 via an interface, such as a video interface 1132. In addition to the monitor, computers may also include other peripheral output devices such as speakers 1144 and printer 1143, which may be connected through an output peripheral interface 1133.

The computer 1102 may operate in a networked environment using logical connections to one or more remote computers, such as a remote computer 1146. The remote computer 1146 may be a personal computer, a server, a router, a network PC, a peer device or other common network node, and typically includes many or all of the elements described above relative to the computer 1102, although only a memory storage device 1147 has been illustrated in FIG. 11. The logical connections depicted in FIG. 11 include a local area network (LAN) 1145 and a wide area network (WAN) 1149, but may also include other networks. Such networking environments are commonplace in offices, enterprise-wide computer networks, intranets, the Internet, and cloud computing resources.

When used in a LAN networking environment, the computer 1102 is connected to the LAN 1145 through a network interface or adapter 1137. When used in a WAN networking environment, the computer 1102 typically includes a modem 1105 or other means for establishing communications over the WAN 1149, such as the Internet. The modem 1105, which may be internal or external, may be connected to the system bus 1121 via the user input interface 1136, or other appropriate mechanism. In a networked environment, program modules depicted relative to the computer 1102, or portions thereof, may be stored in the remote memory storage device. By way of example, and not limitation, FIG. 11 illustrates remote application programs 1148 as residing on memory device 1147. It will be appreciated that the network connections shown are example and other means of establishing a communications link between the computers may be used.

In some aspects, other programs 1127 may include a load balancer bypass application or subroutine 1165 that includes the functionality as described above. In some cases, load balancer bypass application 1165, may execute some or all operations of processes 600, 700, 800, and/or 1000 and may utilize data structure 900. In some aspects, computing device 1102 may also communicate with one or more VMs, such as VM 228, 230, etc.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the disclosure. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of certain of the disclosure.

What is claimed is:

1. A data center, the data center comprising:
   a source host device, a destination host device, and a third host device;
   a plurality of virtual machines, wherein a source virtual machine of the plurality of virtual machines is provided by the source host device and a destination virtual machine of the plurality of virtual machines is provided by the destination host device; and
   a load balancer communicatively coupled with the source host device, the destination host device, the third host device, and the plurality of virtual machines, wherein the load balancer is configured to:
      establish a load balancer bypass between the source virtual machine and the destination virtual machine;
      associate source virtual machine identification information, source host identification information, destination virtual machine identification information, and destination host identification information with an indication in a bypass data structure, wherein the indication indicates whether the load balancer bypass is active;
      determining that live migration of at least one of the source virtual machine or the destination virtual machine has been completed to the third host device; and
      updating the bypass data structure with identification information of the third host device to maintain the load balancer bypass after completion of the live migration.

2. The data center of claim 1, wherein the load balancer is further configured to:
   communicate the updated bypass data structure to at least one of the source host device, the destination host device, or the third host device.

3. The method of claim 1, wherein the source virtual machine is configured to:
   transmit at least one data packet to the destination virtual machine according to the updated bypass data structure, wherein at least one of the source virtual machine or the destination virtual machine is associated with the third host device.

4. The data center of claim 1, wherein determining that live migration of at least one of the source virtual machine or the destination virtual machine has been completed to the third host further comprises:
   determining that the source host identification information or the destination host identification information has changed without a corresponding change in the source virtual machine identification information or the destination virtual machine identification information.

5. A method for managing a load balancer bypass between two virtual machines through live migration of at least one of the two virtual machines, the method comprising:
   establishing a load balancer bypass between a source virtual machine associated with a source host and a destination virtual machine associated with a destination host;
   associating source virtual machine identification information, source host identification information, destination virtual machine identification information, and destination host identification information with an indication in a bypass data structure, wherein the indication indicates whether the load balancer bypass is active;

determining that live migration of at least one of the source virtual machine or the destination virtual machine has been completed to a third host; and updating the bypass data structure with identification information of the third host to maintain the load balancer bypass after completion of the live migration.

6. The method of claim 5, further comprising:

communicating the updated bypass data structure to at least one of the source host, the destination host, or the third host.

7. The method of claim 5, further comprising:

transmitting at least one data packet from the source virtual machine to the destination virtual machine according to the updated bypass data structure, wherein at least one of the source virtual machine or the destination virtual machine is associated with the third host.

8. The method of claim 5, wherein determining that live migration of at least one of the source virtual machine or the destination virtual machine has been completed to the third host further comprises:

determining that the source host identification information or the destination host identification information has changed without a corresponding change in the source virtual machine identification information or the destination virtual machine identification information.

9. The method of claim 5, wherein the bypass data structure comprises a first hash table keyed to the destination virtual machine identification information and the destination host identification information, wherein the first hash table contains a second hash table keyed to the host virtual machine identification information and the source host identification information, and wherein the second hash table contains the indication.

10. The method of claim 5, wherein the source virtual machine identification information, the source host identification information, the destination virtual machine identification information, the destination host identification information, and the indication comprises a first bypass entry of multiple bypass entries in the bypass data structure, and wherein the indication comprises a time stamp corresponding to the last time the first bypass entry was updated by one of the source host or the destination host.

11. The method of claim 10, further comprising:

comparing the time stamp with a threshold time period; and deleting the first bypass entry based on the comparison.

12. A computing system, comprising:

a source host;

a destination host; and a computing device for managing a load balancer bypass between two virtual machines through live migration of at least one of the two virtual machines, the computing device configured to:

establish the load balancer bypass between a source virtual machine associated with the source host and a destination virtual machine associated with the destination host;

associate source virtual machine identification information, source host identification information, destination virtual machine identification information, and destination host identification information with an indication in a bypass data structure, wherein the indication indicates whether the load balancer bypass is active;

determine that live migration of at least one of the source virtual machine or the destination virtual machine has been completed to a third host; and update the bypass data structure with identification information of the third host to maintain the load balancer bypass after completion of the live migration.

13. The computing system of claim 12, wherein the computing device is further configured at least to communicate the updated bypass data structure to at least one of the source host, the destination host, or the third host.

14. The computing system of claim 12, wherein the computing device is further configured at least to:

transmit at least one data packet from the source virtual machine to the destination virtual machine according to the updated bypass data structure, wherein at least one of the source virtual machine or the destination virtual machine is associated with the third host.

15. The computing system of claim 12, wherein computing device configured at least to determine that live migration of at least one of the source virtual machine or the destination virtual machine has been completed to the third host further comprises the at least one computing device configured at least to:

determine that the source host identification information or the destination host identification information has changed without a corresponding change in the source virtual machine identification information or the destination virtual machine identification information.

16. The computing system of claim 12, wherein the bypass data structure comprises a first hash table keyed to the destination virtual machine identification information and the destination host identification information, wherein the first hash table contains a second hash table keyed to the host virtual machine identification information and the source host identification information, and wherein the second hash table contains the indication.

17. The computing system of claim 12, wherein the source virtual machine identification information, the source host identification information, the destination virtual machine identification information, the destination host identification information, and the indication comprises a first bypass entry of multiple bypass entries in the bypass data structure, and wherein the indication comprises a time stamp corresponding to the last time the first bypass entry was updated by one of the source host or the destination host.

18. The computing system of claim 17, wherein the at least one computing device is further configured at least to compare the time stamp with a threshold time period; and delete the first bypass entry based on the comparison.

19. The computing system of claim 12, wherein the computing device comprises at least one of a load balancer, a load balance manager, or a multiplexer.

* * * * *